(12) United States Patent
Iwakiri (10) Patent No.: US 10,837,353 B2
(45) Date of Patent: Nov. 17, 2020

(54) PIPE CONNECTION STRUCTURE

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 288 days.

(21) Appl. No.: 15/569,108

(22) PCT Filed: Nov. 9, 2015

(86) PCT No.: PCT/JP2015/081491
§ 371 (c)(1),
(2) Date: Oct. 25, 2017

(87) PCT Pub. No.: WO2017/081726
PCT Pub. Date: May 18, 2017

(65) Prior Publication Data
US 2018/0119605 A1    May 3, 2018

(51) Int. Cl.
*F16L 41/02*    (2006.01)
*F02B 37/18*    (2006.01)
(Continued)

(52) U.S. Cl.
CPC .............. *F02B 37/18* (2013.01); *F02B 37/00* (2013.01); *F02B 37/013* (2013.01); *F02B 37/16* (2013.01);
(Continued)

(58) Field of Classification Search
CPC ... F16L 41/02; F16L 41/023; F02M 35/10091
(Continued)

(56) References Cited

U.S. PATENT DOCUMENTS 791,078 A * 5/1905 Corson .................... 137/247.11
1,209,869 A * 12/1916 Murphy ................ F16L 41/023
285/132.1
(Continued)

FOREIGN PATENT DOCUMENTS

CN    201826936 U    5/2011
DE    20109322 U1    8/2001
(Continued)

OTHER PUBLICATIONS

Extended European Search Report, dated Jan. 23, 2018, for European Application No. 15908250.2.
(Continued)

*Primary Examiner* — Aaron M Dunwoody
(74) *Attorney, Agent, or Firm* — Birch, Stewart, Kolasch & Birch, LLP (57) ABSTRACT

A pipe connection structure according to an embodiment of the present invention includes: two inlet pipes through which a gas is capable of flowing; a connection pipe to which respective outlet-side end portions of the two inlet pipes are connected at a distance; and an outlet pipe connected to the connection pipe at an opposite side to a side where the two inlet pipes are connected to the connection pipe, the outlet pipe being capable of being in communication with the two inlet pipes via a space section inside the connection pipe. The two inlet pipes include a first inlet pipe disposed on a first side and a second inlet pipe disposed on a second side, in a width direction of the connection pipe, across a middle of connection positions of the two inlet pipes to the connection pipe. The outlet pipe is connected to a position offset toward the second side in the width direction of the connection pipe. Along an axial direction of the first inlet pipe, the space section inside the connection pipe has an axial length not smaller than a virtual diameter D defined (Continued)

by following expression (1) $D=\sqrt{(4A/\pi)}$, where A is a cross-sectional area of the first inlet pipe and $\pi$ is pi.

8 Claims, 8 Drawing Sheets

(51) Int. Cl.
*F02B 37/00* (2006.01)
*F02B 37/16* (2006.01)
*F02B 37/013* (2006.01)
*F02M 35/10* (2006.01)

(52) U.S. Cl.
CPC .............. *F02M 35/10091* (2013.01); *F02M 35/10157* (2013.01); *F16L 41/02* (2013.01); *F16L 41/023* (2013.01); *F01N 2340/00* (2013.01); *Y02T 10/144* (2013.01)

(58) Field of Classification Search
USPC .............................................. 285/132.1, 188
See application file for complete search history.

(56) References Cited

U.S. PATENT DOCUMENTS

| | | | |
|---|---|---|---|
| 2,216,460 A * | 10/1940 | Sisk | E03C 1/122 4/211 |
| 2,292,329 A * | 8/1942 | Sisk | E03C 1/122 285/132.1 |
| 2,570,525 A * | 10/1951 | Collison | E03C 1/122 285/129.1 |
| 5,214,253 A | 5/1993 | Houston, Jr. | |
| RE39,509 E * | 3/2007 | Helms | E21B 17/025 166/117.5 |
| 2010/0095672 A1 | 4/2010 | An | |
| 2010/0181244 A1 * | 7/2010 | Stimpson | B01D 35/02 210/232 |
| 2011/0186373 A1 | 8/2011 | Mori et al. | |
| 2015/0040561 A1 | 2/2015 | Matsui | |
| 2015/0052891 A1 | 2/2015 | Uehane et al. | |
| 2018/0045150 A1 * | 2/2018 | Ito | F02M 35/10222 |

FOREIGN PATENT DOCUMENTS

| | | |
|---|---|---|
| DE | 202015100529 U1 | 2/2015 |
| EP | 1612385 A1 | 1/2006 |
| FR | 3013079 A1 | 5/2015 |
| JP | 9-125949 A | 5/1997 |
| JP | 2003-254051 A | 9/2003 |
| JP | 2003-328747 A | 11/2003 |
| JP | 2005-146857 A | 6/2005 |
| JP | 2006-307740 A | 11/2006 |
| JP | 2007-278156 A | 10/2007 |
| JP | 2009-92045 A | 4/2009 |
| JP | 2009-281333 A | 12/2009 |
| JP | 2010-24878 A | 2/2010 |
| JP | 2011-58427 A | 3/2011 |
| JP | 2011-156952 A | 8/2011 |
| JP | 2012-225297 A | 11/2012 |
| JP | 2012-255418 A | 12/2012 |
| JP | 2013-24205 A | 2/2013 |
| JP | 2015-42850 A | 3/2015 |
| WO | WO 91/17376 A1 | 11/1991 |
| WO | WO 2013/145278 A1 | 10/2013 |

OTHER PUBLICATIONS

International Preliminary Report on Patentability and Written Opinion of the International Searching Authority (forms PCT/IB/373, PCT/ISA/237, PCT/IB/338 and PCT/IB/326), dated May 24, 2018, for International Application No. PCT/JP2015/081491, with English translation of the Written Opinion.
International Search Report (forms PCT/ISA/210 and PCT/ISA/220), dated Feb. 2, 2016, for International Application No. PCT/JP2015/081491.
Japanese Office Action, dated Jun. 8, 2018, for Japanese Application No. 2017-549881, with an English machine translation.
Office Action dated Sep. 19, 2018 issued in the corresponding EP Application No. 15 908 250.2.
Japanese Office Action, dated Dec. 21, 2018, for Japanese Application No. 2017-549881, with an English machine translation.
Office Action dated Mar. 29, 2019 to corresponding Chinese Application No. 201580081071.1 with an English Translation.
Office Action dated Nov. 19, 2019 issued in the corresponding Chinese Application No. 201580081071.1 with an English translation.

* cited by examiner

PIPE CONNECTION STRUCTURE

TECHNICAL FIELD

The present disclosure relates to a pipe connection structure in which two inlet pipes and one outlet pipe are connected via a connection pipe.

BACKGROUND ART

As a structure provided with a pipe connection structure in which two inlet pipes and one outlet pipe are connected via a connection pipe, known is a pipe structure connected to a supercharger for supplying a greater amount of intake air to an engine of a vehicle.

For instance, Patent Document 1 discloses a system provided with two superchargers, a high-pressure turbine bypass passage that bypasses the turbine of an upstream supercharger, an exhaust control valve for opening and closing the bypass passage, a high-pressure compressor bypass passage that bypasses the compressor of the upstream supercharger, and an intake bypass valve for opening and closing the bypass passage, the system being configured to change which of the superchargers is to be driven depending on the operating conditions.

A high-pressure side lead-out pipe (inlet pipe) for leading out exhaust gas is connected to the turbine of the upstream supercharger, and the high-pressure side lead-out pipe (inlet pipe) and the high-pressure turbine bypass passage (inlet pipe) are in communication with the high-pressure turbine outlet side layout passage (outlet pipe).

CITATION LIST

Patent Literature

Patent Document 1: JP2010-24878A

SUMMARY

Problems to be Solved

In the supercharging system provided with two superchargers disclosed in Patent Document 1, for the sake of the layout inside the engine room of the vehicle, the high-pressure turbine outlet side layout passage (outlet pipe) may be disposed in a position offset from the middle of the high-pressure side lead-out pipe (inlet pipe) and the high-pressure turbine bypass passage (inlet pipe). In this case, it is necessary to connect the farther inlet pipe from the high-pressure turbine outlet side layout passage (outlet pipe) to the outlet pipe via a connection pipe.

In this case, a flow of exhaust gas discharged from the farther inlet pipe from the outlet pipe is redirected by the connection pipe into a direction nearly orthogonal to the discharging direction from the inlet pipe. Furthermore, if a space is formed between the outlet pipe and the inlet pipe closer to the outlet pipe, a swirl flow may be generated, where exhaust gas flowing through the connection pipe flows toward the outlet pipe while swirling. If such a swirl flow occurs, pressure loss of the pipe may increase, and the turbine performance of the supercharger disposed on the downstream side may deteriorate.

At least one embodiment of the present invention was made under the above situation of prior art, and an object of the present invention is to provide, in a case where two inlet pipes are connected to an outlet pipe via a connection pipe, a pipe connection structure capable of introducing gas that flows through a connection pipe into an outlet pipe, while suppressing the risk of the gas becoming a swirl flow.

Solution to the Problems (1) A pipe connection structure according to at least one embodiment of the present invention comprises: two inlet pipes through which a gas is capable of flowing; a connection pipe to which respective outlet-side end portions of the two inlet pipes are connected at a distance; and an outlet pipe connected to the connection pipe at an opposite side to a side where the two inlet pipes are connected to the connection pipe, the outlet pipe being capable of being in communication with the two inlet pipes via a space section inside the connection pipe. The two inlet pipes include a first inlet pipe disposed on a first side and a second inlet pipe disposed on a second side, in a width direction of the connection pipe, across a middle of connection positions of the two inlet pipes to the connection pipe. The outlet pipe is connected to a position offset toward the second side in the width direction of the connection pipe. Along an axial direction of the first inlet pipe, the space section inside the connection pipe has an axial length not smaller than a virtual diameter D defined by the following expression (1).

$$D=\sqrt{(4A/\pi)}$$

In the above expression, A is a cross-sectional area of the first inlet pipe and $\pi$ is pi.

The pipe connection structure described in the above (1) has an axial length of not less than the virtual diameter D defined by the following expression (1), along the axial direction of the first inlet pipe.

(Expression 1)

$$D=\sqrt{(4A/\pi)} \qquad (1)$$

In the above expression, A is the cross-sectional area of the first inlet pipe and $\pi$ is pi.

In the above expression, "A" represents the cross-sectional area of the first inlet pipe, and the cross-sectional shape of the first inlet pipe is not particularly limited. Thus, the cross-sectional shape of the first inlet pipe includes any of a circular shape, a rectangular shape, a combination of the above, and the like. Furthermore, with the axial length of the space section inside the connection pipe being not smaller than the virtual diameter D, it is possible to enhance the linearity of the gas discharged from the first inlet pipe. Thus, it is possible to provide a pipe connection structure capable of guiding the gas that flows inside the connection pipe to the outlet pipe while suppressing the risk of the gas becoming a swirl flow.

(2) A pipe connection structure according to at least one embodiment of the present invention comprises: two inlet pipes through which a gas is capable of flowing; a connection pipe to which respective outlet-side end portions of the two inlet pipes are connected at a distance; and an outlet pipe connected to the connection pipe at an opposite side to a side where the two inlet pipes are connected to the connection pipe, the outlet pipe being capable of being in communication with the two inlet pipes via a space section inside the connection pipe. The two inlet pipes include a first inlet pipe disposed on a first side and a second inlet pipe disposed on a second side, in a width direction of the connection pipe, across a middle of connection positions of the two inlet pipes to the connection pipe. The outlet pipe is connected to a position offset toward the second side in the width direction of the connection pipe. An axial length of the space section inside the connection pipe, along an axial direction of the first inlet pipe, is not less than 50% of a length between a connection position at which the first inlet pipe is connected to the connection pipe and a connection position at which the outlet pipe is connected to the connection pipe, along the axial direction of the first inlet pipe.

With the above pipe connection structure (2), the axial length (hereinafter, "linear portion length L1") of the space section along the axial direction of the first inlet pipe is not less than 50% of the length (hereinafter, "linear portion length L2") of the first inlet pipe along the axial direction between the connection position of the first inlet pipe to the connection pipe and the connection position of the outlet pipe to the connection pipe. The invention according to claim 2 is intended to increase the linear portion length L1 as much as possible under the limitation of the linear portion length L2. If the linear portion length L1 is too short, the flow of gas discharged from the first inlet pipe gets turned immediately into the direction toward the second inlet pipe, and a swirl flow is generated. However, with the linear portion length L1 being large, the flow of gas discharged from the first inlet pipe is less likely to produce a swirl flow, as a result of enhancement of a velocity component in the linear direction. Thus, it is possible to provide a pipe connection structure capable of guiding the gas inside the connection pipe to the outlet pipe while suppressing the risk of the gas becoming a swirl flow. The pipe connection structure (2) may have the configuration of the above pipe connection structure (1) as well.

(3) In some embodiments, in the above pipe connection structure (1) or (2), an inner wall forming the space section inside the connection pipe includes a top-portion inner wall to which the outlet pipe is connected and which is disposed between the outlet pipe and the first inlet pipe. A curved portion curved in an arc shape and protruding into the space section is formed on the top-portion inner wall.

According to the above embodiment (3), the inner wall forming the space section inside the connection pipe includes a top-portion inner wall on the side to which the outlet pipe is connected, the top-portion inner wall being positioned between the outlet pipe and the first inlet pipe. A curved portion curved in an arc shape and protruding into the space section is formed on the top-portion inner wall. The outlet pipe is disposed on a position offset toward one side in the width direction of the connection pipe with respect to the first inlet pipe and the second inlet pipe. The gas discharged from the first inlet pipe flows through the space section with an enhanced linearly and into the outlet pipe. Thus, the flow of the gas is likely to deviate corresponding to the amount of offset of the outlet pipe to the one side in the width direction of the connection pipe. Accordingly, pressure loss of gas that flows through the outlet pipe increases. In this regard, the inner wall forming the space section inside the connection pipe includes a top-portion inner wall on the side to which the outlet pipe is connected, the top-portion inner wall being positioned between the outlet pipe and the first inlet pipe. A curved portion is formed on the top-portion inner wall. The curved portion may weaken the linearity of the gas and generate a swirl flow, but a swirl low is likely to be generated only in the vicinity of the inlet of the connection pipe where the space section is widened. The space section is narrow in the vicinity of the outlet of the connection pipe, and thus the swirl flow occurs only slightly. Thus, with the curved portion protruding into the space section disposed on the top-portion inner wall disposed between the outlet pipe and the first inlet pipe, some swirl flow may occur, but it is possible to cancel a deviated flow reliably.

(4) In some embodiments, in the above pipe connection structure (3), the curved portion has an inner wall forming the curved portion, and a part of the inner wall on a side of the outlet pipe is formed on a position adjoining to an inner wall of the outlet pipe on a side of the curved portion.

According to the above embodiment (4), the curved portion is configured such that the inner wall disposed on the side of the outlet pipe, of the inner wall forming the curved portion, is formed on a position in contact with the inner wall of the outlet pipe on the side of the curved portion. Thus, it is possible to suppress generation of a swirl flow effectively, and to cancel a deviated flow of the gas flowing into the outlet pipe.

(5) In some embodiments, in the above pipe connection structure (3) or (4), the curved portion extends in a direction substantially orthogonal to a moving direction of the gas flowing toward the outlet pipe via the space section inside the connection pipe from the first inlet pipe.

According to the above embodiment (5), the curved portion extends in a direction substantially orthogonal to the moving direction of the gas flowing toward the outlet pipe via the space section inside the connection pipe from the first inlet pipe. Thus, when the gas passes through the curved portion, it is possible to send the flow of gas in a direction substantially orthogonal to the extending direction of the curved portion, and to spread the gas flow deviated to one side of the outlet pipe to the other side of the outlet pipe. Thus, it is possible to improve the accuracy of removal of the flow rate distortion of gas flowing into the outlet pipe.

(6) In some embodiments, in the pipe connection structure according to any one of the above (1) to (5), the first inlet pipe is applied to a high-pressure side turbine lead-out passage for leading out exhaust gas discharged from a turbine of a high-pressure turbo in a two-stage supercharging system including the high-pressure turbo and a low-pressure turbo connected to each other in series. The second inlet pipe is applied to a high-pressure side turbine bypass passage which bypasses the turbine of the high-pressure turbo. The outlet pipe is applied to a low-pressure side turbine introduction passage for introducing the exhaust gas to a turbine of the low-pressure turbo. The high-pressure side turbine lead-out passage, the high-pressure side turbine bypass passage, and the low-pressure side turbine introduction passage are connected to the connection pipe.

According to the above embodiment (6), the first inlet pipe is applied to the high-pressure side turbine lead-out passage for leading out exhaust gas discharged from the turbine of the high-pressure turbo in the two-stage supercharging system in which the low-pressure turbo and the high-pressure turbo are connected in series. The second inlet pipe is applied to the high-pressure side turbine bypass passage bypassing the turbine of the high-pressure turbo. The outlet pipe is applied to the low-pressure side turbine introduction passage which introduces exhaust gas into the turbine of the low-pressure turbo. Further, the high-pressure side turbine lead-out passage, the high-pressure side turbine bypass passage, and the low-pressure side turbine introduction passage are connected to the connection pipe.

As described above, the pipe connection structure capable of suppressing generation of a swirl flow is disposed in a flow passage connected to the turbine side of the high-pressure turbo, in the two-stage supercharging system, and thereby it is possible to suppress occurrence of an event in which exhaust gas becomes a swirl flow to be supplied to the low-pressure turbo. Thus, it is possible to suppress performance reduction of the low-pressure turbo.

(7) In some embodiments, in the pipe connection structure described in any one of the above (1) to (5), the first inlet pipe is applied to a high-pressure side compressor lead-out passage for leading out intake gas from a compressor of a high-pressure turbo in a two-stage supercharging system including the high-pressure turbo and a low-pressure turbo connected to each other in series. The second inlet pipe is applied to a high-pressure side compressor bypass passage which bypasses the compressor of the high-pressure turbo. The outlet pipe is applied to a supply air introduction passage for introducing the intake gas to an engine of the two-stage supercharging system. The high-pressure side compressor lead-out passage, the high-pressure side compressor bypass passage, and the supply air introduction passage are connected to the connection pipe.

According to the above embodiment (7), the first inlet pipe is applied to the high-pressure side compressor lead-out passage for leading out intake gas from the compressor of the high-pressure turbo in the two-stage supercharging system in which the low-pressure turbo and the high-pressure turbo are connected in series. The second inlet pipe is applied to the high-pressure side compressor bypass passage bypassing the compressor of the high-pressure turbo. The outlet pipe is applied to the supply air introduction passage for introducing intake gas to the engine of the two-stage supercharging system. Furthermore, the high-pressure side compressor lead-out passage, the high-pressure side compressor bypass passage, and the supply air introduction passage are connected to the connection pipe.

As described above, the pipe connection structure capable of suppressing generation of a swirl flow is disposed in a flow passage connected to the compressor side of the high-pressure turbo, in the two-stage supercharging system, and thereby it is possible to suppress occurrence of an event in which exhaust gas becomes a swirl flow to be supplied to an engine.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, the same features are associated with the same reference numerals and not described again.

Figure 1:
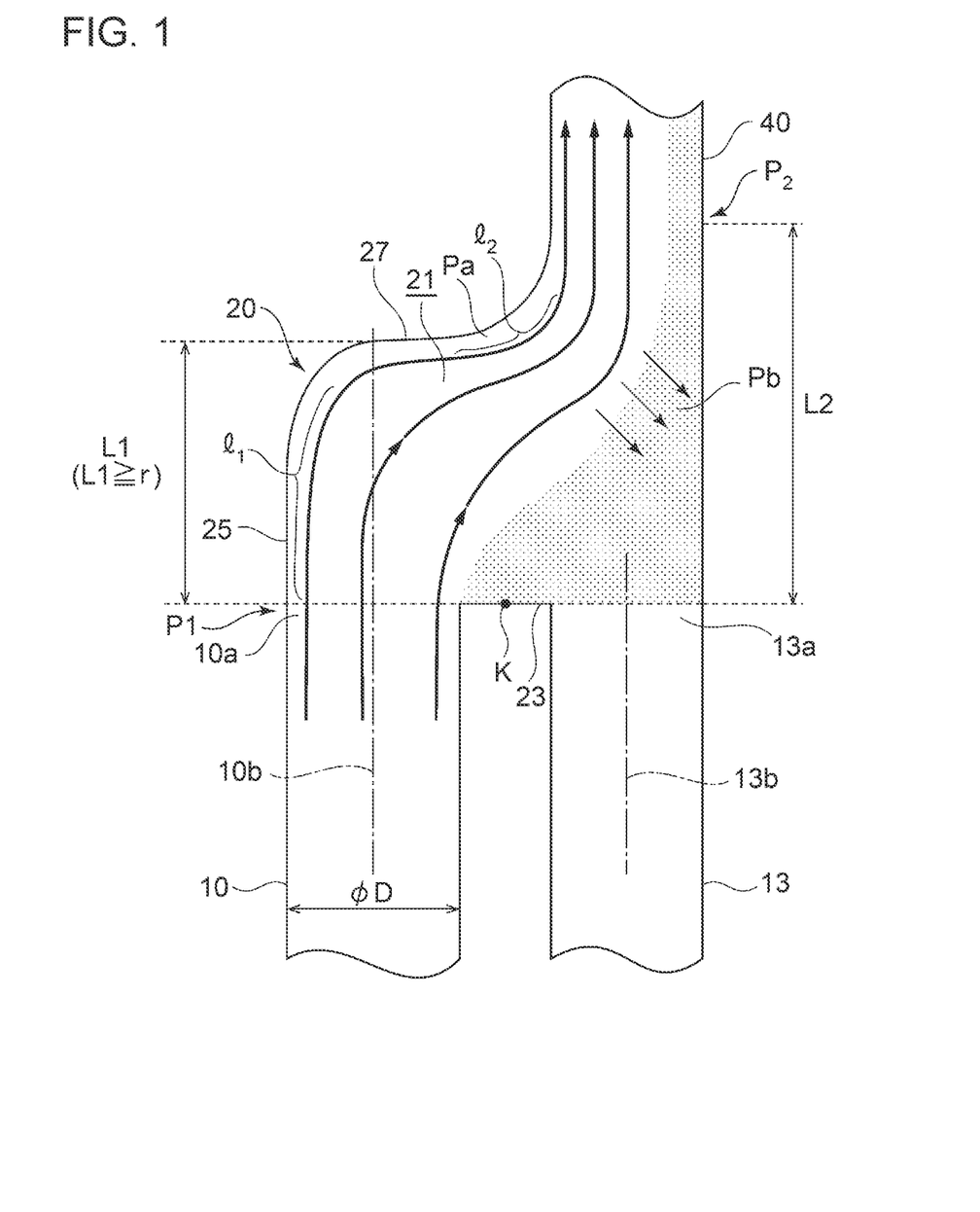
FIG. 1 is a cross-sectional view of a pipe connection structure according to an embodiment of the present invention, taken along the axial direction of the inlet pipe of the pipe connection structure.
Figure 2:
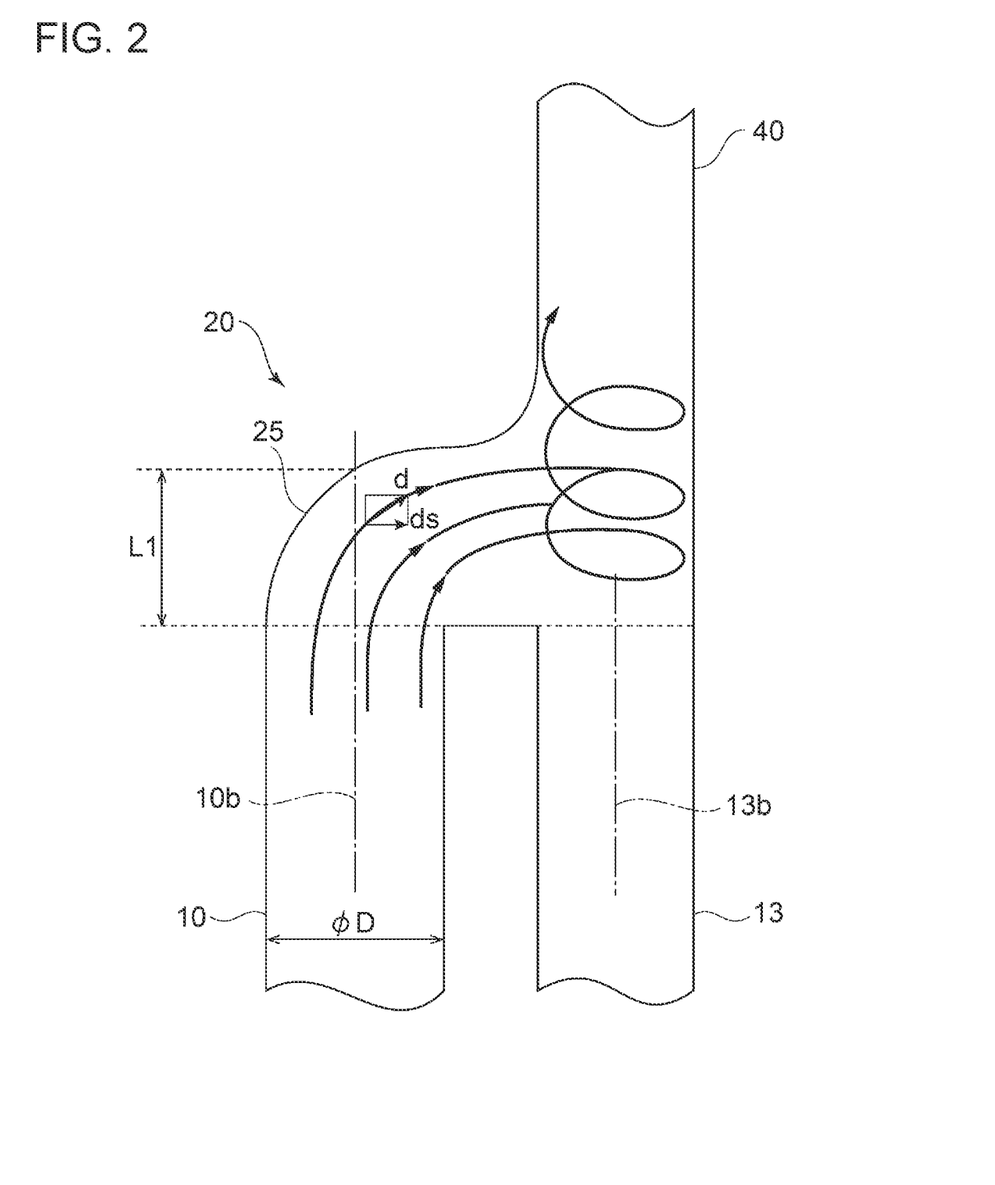
FIG. 2 is a cross-sectional view of a pipe connection structure of a comparative example, where the length of a space section in the connection pipe is relatively shorter than that of the pipe connection structure of the present invention.
Figure 3:
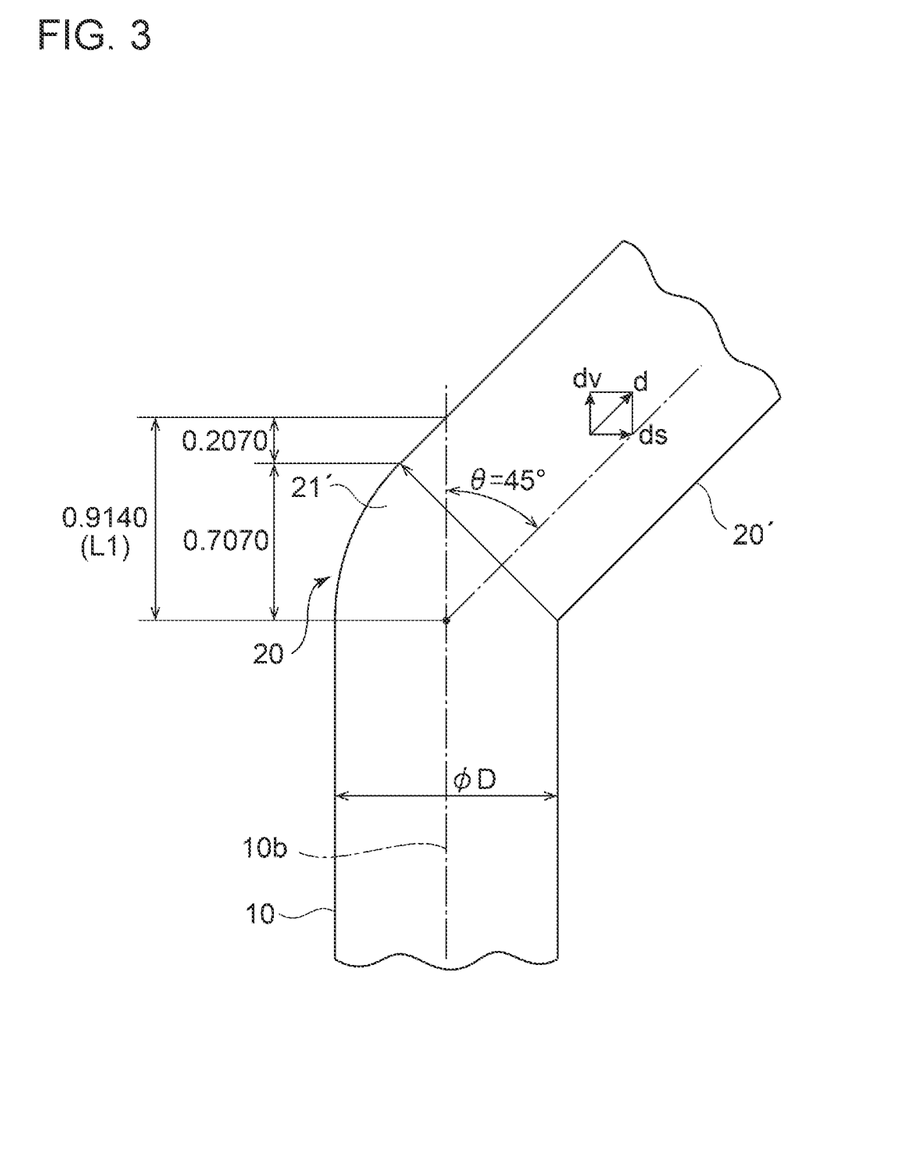
FIG. 3 is a cross-sectional view of a pipe connection structure of a comparative example provided with a connection pipe having a flow passage inclined with respect to the inlet pipe.
Figure 4:
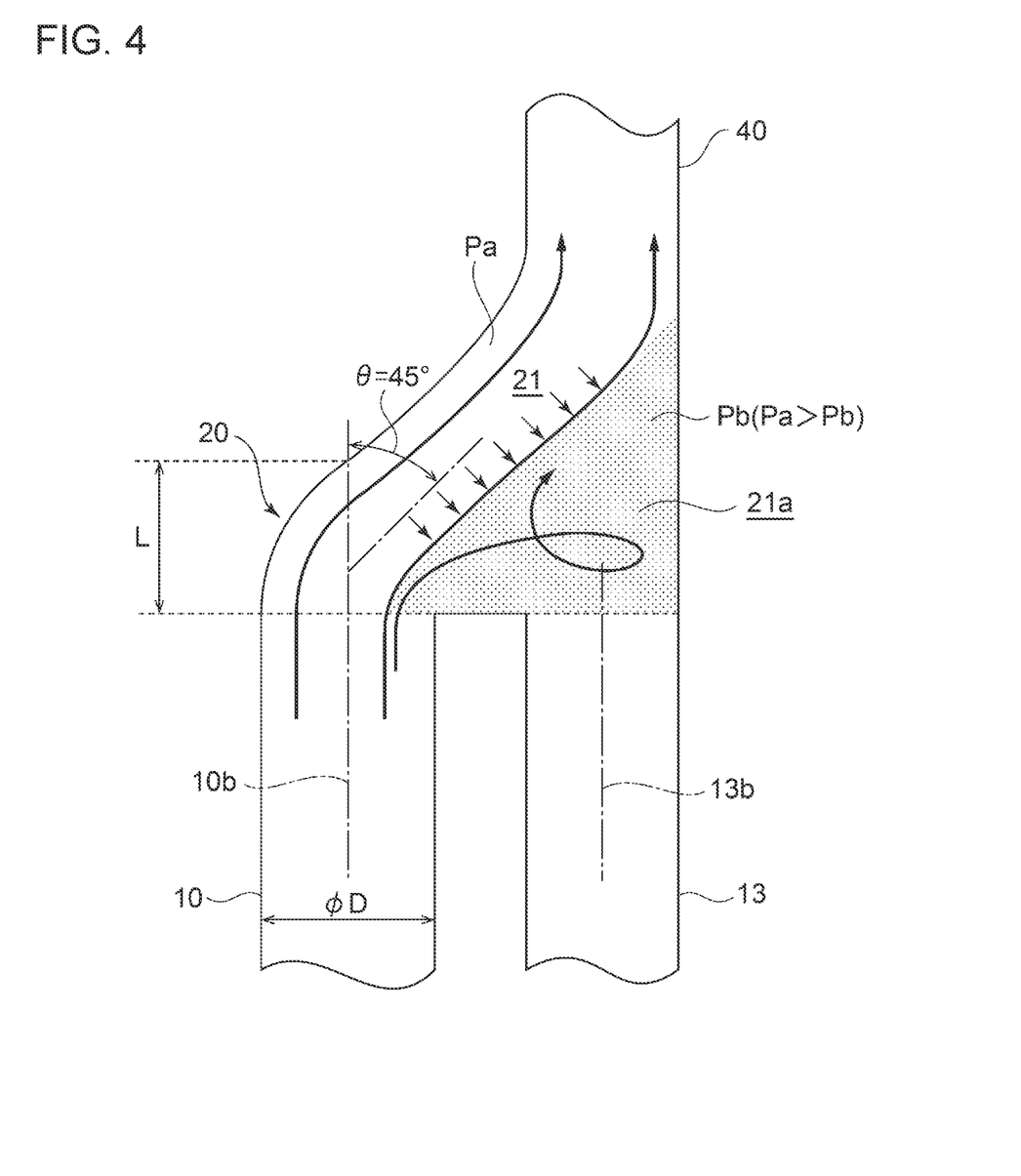
FIG. 4 is a cross-sectional view of a pipe connection structure of a comparative example provided with a connection pipe having a flow passage inclined with respect to the inlet pipe, compared to the pipe connection structure of the present invention.
Figure 5A:
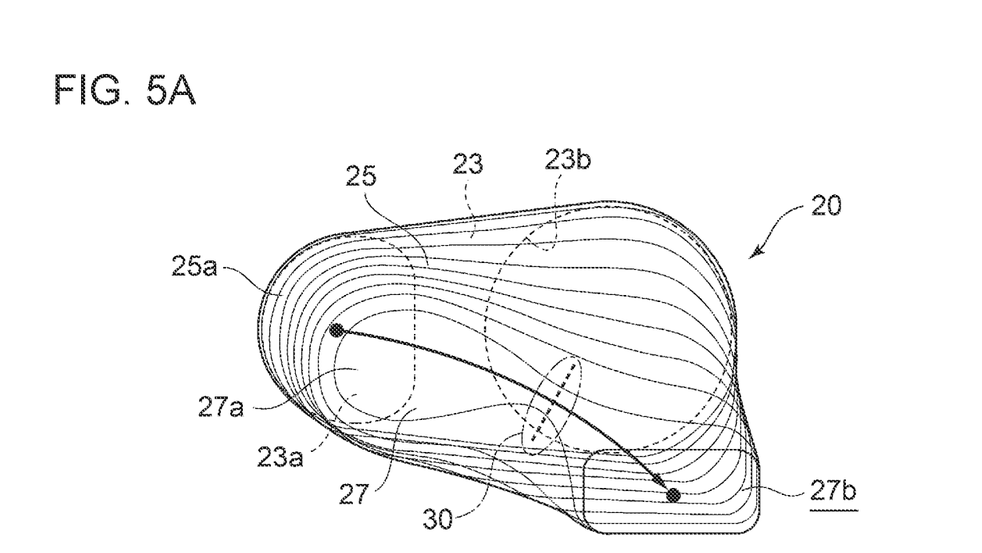
FIG. 5A is a planar view of a connection pipe, which is a part of the pipe connection structure of the present invention.
Figure 5B:
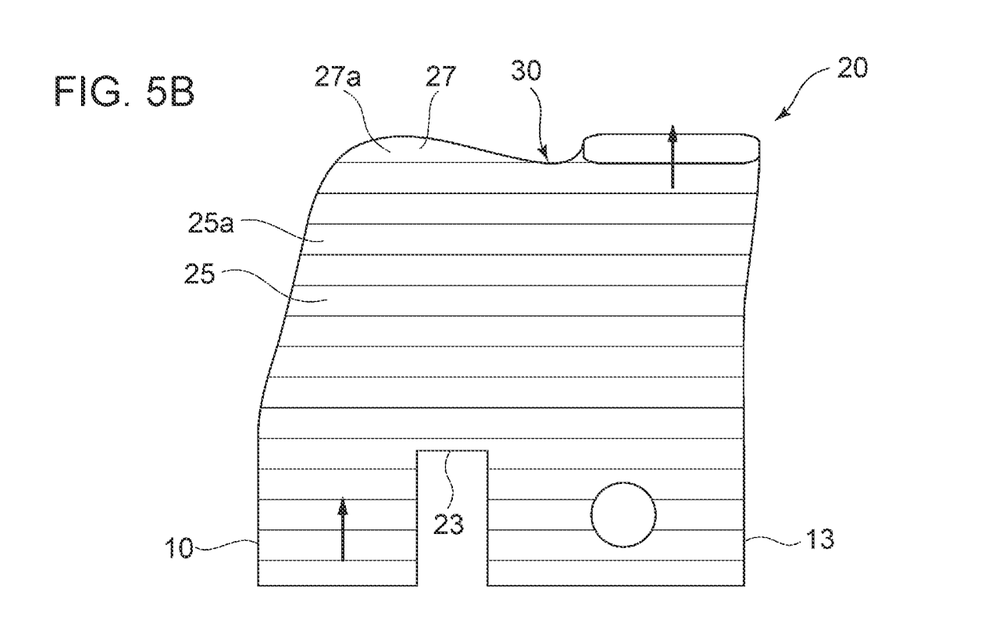
FIG. 5B is a side view of the connection pipe.
Figure 8:
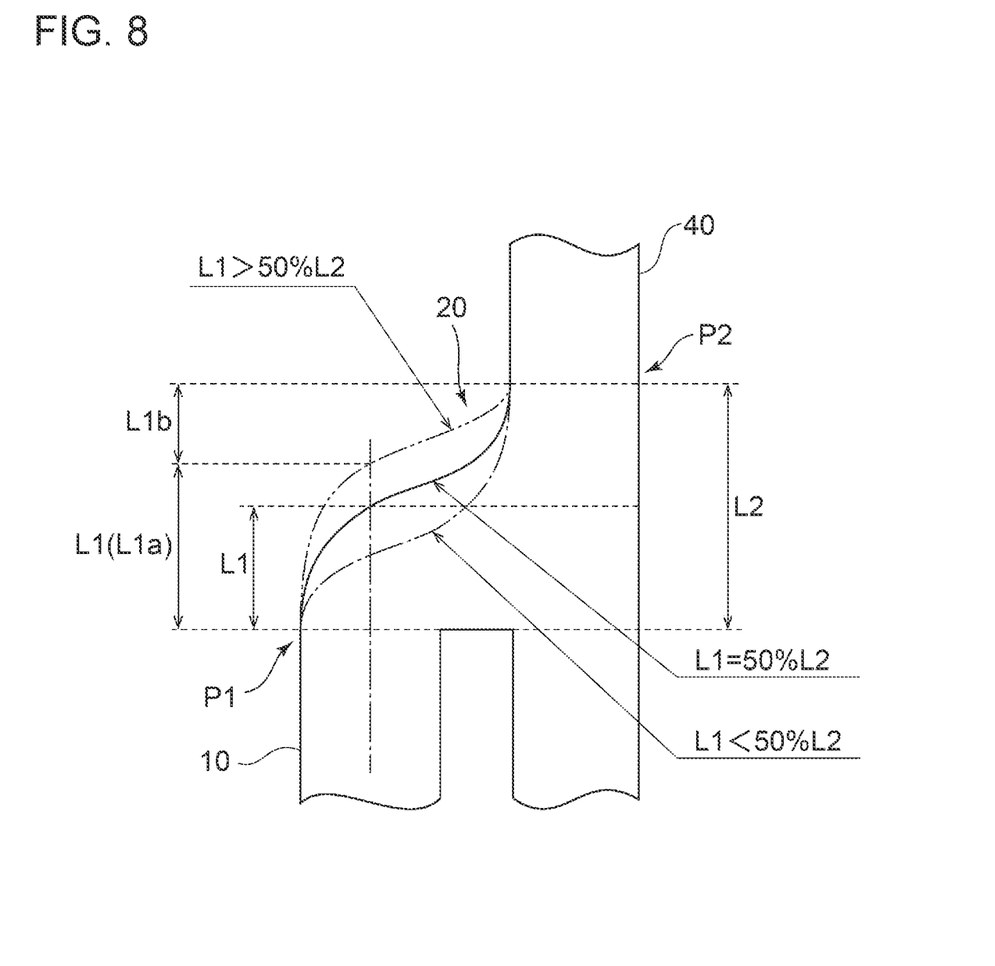
FIG. 8 is a cross-sectional view of the connection pipe for describing the length of the linear portion of the connection pipe of the pipe connection structure according to the present invention.

FIG. 1 is a cross-sectional view of a pipe connection structure according to an embodiment of the present invention, taken along the axial direction of the inlet pipe of the pipe connection structure. FIG. 2 is a cross-sectional view of a pipe connection structure of a comparative example, where the length of a space section in the connection pipe is relatively shorter than that of the pipe connection structure of the present invention. FIG. 3 is a cross-sectional view of a pipe connection structure of a comparative example provided with a connection pipe having a flow passage inclined with respect to the inlet pipe. FIG. 4 is a cross-sectional view of a pipe connection structure of a comparative example provided with a connection pipe having a flow passage inclined with respect to the inlet pipe, compared to the pipe connection structure of the present invention. FIG. 5A is a planar view of a connection pipe, which is a part of the pipe connection structure of the present invention. FIG. 5B is a side view of the connection pipe. FIG. 8 is a cross-sectional view of the connection pipe for describing the length of the linear portion of the connection pipe of the pipe connection structure according to the present invention.

The pipe connection structure according to an embodiment of the present invention is, though not particularly limited, applicable to a two-stage turbo pipe structure to be mounted to an automobile engine, for instance.

As shown in FIG. 1, the pipe connection structure of the present embodiment includes a first inlet pipe 10 and a second inlet pipe 13, through which gas can flow, a connection pipe 20 to which respective outlet-side end portions 10a, 13a of the first inlet pipe 10 and the second inlet pipe 13 are connected at a distance, and an outlet pipe 40 connected to the connection pipe 20 at an opposite side to the side connected to the first inlet pipe 10 and the second inlet pipe 13 and being capable of being in communication with the first inlet pipe 10 and the second inlet pipe 13 via a space section 21 inside the connection pipe 20. The outlet pipe 40 is connected to a position offset toward a side in the width direction (right side in the width direction) of the connection pipe from the middle K of the connection positions of the first inlet pipe 10 and the second inlet pipe 13 to the connection pipe 20. The space section 21 inside the connection pipe 20, which is in communication with the first inlet pipe 10 farther from the outlet pipe 40 than the second inlet pipe 13, extends along the axial direction of the first inlet pipe 10, and is formed to have an axial length L1 of not smaller than a virtual diameter D of the first inlet pipe defined by the following expression (1).

(Expression 1)

$$D=\sqrt{(4A/\pi)} \quad (1)$$

In the above expression, A is the cross-sectional area of the first inlet pipe and $\pi$ is pi.

In the depicted embodiment, the cross section of the outlet-side end portion 10a of the first inlet pipe 10 is a shape including an arc and a straight line (see FIG. 5A), while the cross section of the second inlet pipe 13 has a circular shape (see FIG. 5A). The cross sectional areas of the first inlet pipe 10 and the second inlet pipe 13 may be the same, or different. The outlet-side end portions 10a, 13a of the first inlet pipe 10 and the second inlet pipe 13, respectively, are connected to a bottom portion 23 of the connection pipe 20. The outlet-side end portions 10a, 13a of the first inlet pipe 10 and the second inlet pipe 13, respectively, are disposed at a distance so that their axes 10b, 13b are parallel to each other.

The first inlet pipe 10 and the second inlet pipe 13 can let gas flow through, and the first inlet pipe 10 and the second inlet pipe 13 are configured such that gas flows selectively through only one of the first inlet pipe 10 or the second inlet pipe 13.

The outlet pipe 40 is formed to have a tube shape of a rectangular cross section (see FIG. 5A). It should be noted that the cross-sectional shape of the outlet pipe 40 is not limited to a rectangular shape, but may be a circular shape. Furthermore, the cross-sectional area of the outlet pipe 40 may be different in size from the cross-sectional area of the first inlet pipe 10, 13. In the depicted embodiment, the outlet pipe 40 is connected to a position offset to one side from the middle K of the connection positions of the first inlet pipe 10 and the second inlet pipe 13 to the connection pipe 20. In the depicted embodiment, the outlet pipe 40 is disposed above the second inlet pipe 13, which is disposed on the right side with respect to the right-left direction, of the first inlet pipe 10 and the second inlet pipe 13. Thus, the gas discharged from the second inlet pipe 13 can flow linearly via the connection pipe 20 into the outlet pipe 40.

As shown in FIGS. 1, 5A, and 5B, the connection pipe 20 is formed to have a box shape that is hollow inside, having a bottom portion 23 formed to have a planar shape, a body portion 25 extending upward from the periphery of the bottom portion 23, and a top portion 27 covering the upper end portion of the body portion 25. In the depicted embodiment, a hole portion 23a including an arc and a straight line in the cross section is formed on one side in the longitudinal direction (left side in the right-left direction) of the bottom portion 23, and a hole portion 23b having a circular cross section is formed on the other side in the longitudinal direction (right side in the right-left direction) of the bottom portion 23. The first inlet pipe 10 and the second inlet pipe 13 are connected to the hole portions 23a, 23b, respectively.

The four corners of the body portion 25 are curved, and the body portion 25 as a whole is formed so as to be inclined inward as the body portion 25 extends upward. The left side, with respect to the right-left direction, of the top portion 27 has a protruding portion 27a protruding and curving upward formed thereon, and the right side, with respect to the right-left direction, of the top portion 27 has a hole portion 27b of a rectangular shape being in communication with the outlet pipe 40.

The vertical length L1 of the space section 21 inside the body portion 25 has an axial length of not smaller than the virtual diameter D of the first inlet pipe defined by the above described expression (1) (see FIG. 1). FIG. 2 is a cross-sectional view of the pipe connection structure of a comparative example, where the vertical length L1 of the body portion 25 is smaller than the virtual diameter D of the first inlet pipe 10. In FIG. 2, when gas is discharged from the first inlet pipe 10, the circumferential component ds of the flow direction d of gas increases with the flow of the gas, and a swirl flow is more likely to occur.

Further, as shown in FIG. 3, in a case where the connection pipe 20' is formed so that the axial length L1 of the space section 21' is substantially the same as the virtual diameter D of the first inlet pipe 10, the inclination angle of the connection pipe 20' extending toward the outlet pipe is approximately 45°, and thus it is possible to equalize the size of the axial component dv of the flow direction d of gas flowing toward the outlet pipe 40 and the size of the circumferential component ds which is perpendicular to the axial component dv.

As shown in FIG. 4, in a case where the vertical length L of the space section 21 is smaller than the virtual diameter D and the inclination angle θ of the connection pipe 20' extending toward the outlet pipe 40 is 45°, a pressure gradient is generated, in which the pressure Pa on the inner side with respect to the gas turning direction before gas flowing through the connection pipe 20 flows into the outlet pipe 40 is greater than the pressure Pb on the outer side of the turning direction (streamline curvature theorem). Thus, of the gas discharged from the first inlet pipe 10, gas flowing on the side of the second inlet pipe 13 may become a swirl flow of gas that flows upward while swirling due to the circumferential component ds of the direction of the gas, which increases pressure loss, because the space section 21a exists between the second inlet pipe 13 and the outlet pipe 40.

If the axial length L1 of the space section 21 is not less than the virtual diameter D of the first inlet pipe 10, as shown in FIG. 1, it is possible to increase the flow passage length L1 of gas that is discharged from the outlet-side end portion 10a of the first inlet pipe 10 and flows linearly. Thus, it is possible to enhance the linearity of the gas discharged from the first inlet pipe 10. Thus, it is possible to suppress the risk of the gas that flows through the connection pipe 20 becoming a swirl flow.

In some embodiments, the axial length L1 of the space section 21 is not less than 50% of the length L2 of the first inlet pipe 10 along the axial direction between the connection position P1 of the first inlet pipe 10 to the connection pipe 20 and the connection position P2 of the outlet pipe 40 to the connection pipe 20. That is, the axial length L1 of the space section 21 is configured such that the axial length L1 is maximized as much as possible under the limitation of the length L2. In the present embodiment, the axial length L1 of the space section 21 is 73% of the length L2.

If the axial length L1 of the space section 21 is not less than 50% of the length L2, the flow passage length L1 of the gas flowing linearly from the outlet of the first inlet pipe 10 increases, and thereby it is possible to shorten the length of the flow passage flowing toward the outlet pipe 40 inclined from the flow passage extending linearly. According to the streamline curvature theorem, on the upstream side where the gas flows into the outlet pipe 40, while the pressure Pa on the inner side of the gas turning direction is greater than the pressure Pb on the outer side of the turning direction in the generated pressure gradient, the length of the flow passage flowing toward the outlet pipe inclined from the flow passage extending linearly is shortened, and thereby it is possible to shorten the range to which the pressure gradient is applied. Thus, it is possible to suppress an increase in the circumferential component in the direction of the gas due to the function of the pressure gradient. Accordingly, it is possible to further suppress the risk of the gas becoming a swirl flow inside the connection pipe 20.

Furthermore, as shown in FIG. 8, in a case where the axial length L1 of the space section 21 is short, for instance, if L1 is less than 50% of L2 as shown by the single dotted chain line in FIG. 8, the flow inside the curved wall forming the top portion of the connection pipe 20 (inner side of the curvature) of the gas discharged from the first inlet pipe 10 is immediately turned in the horizontal direction, and a swirl flow is likely to occur. However, as shown by the single dotted chain line, in a case where the axial length L1 is greater than 50% of L2, the flow on the inner side of the curvature has a stronger velocity component in the linear direction, and thus it is possible to suppress generation of a swirl flow. Thus, it is possible to suppress the risk of the gas becoming a swirl flow inside the connection pipe 20.

Figure 6:
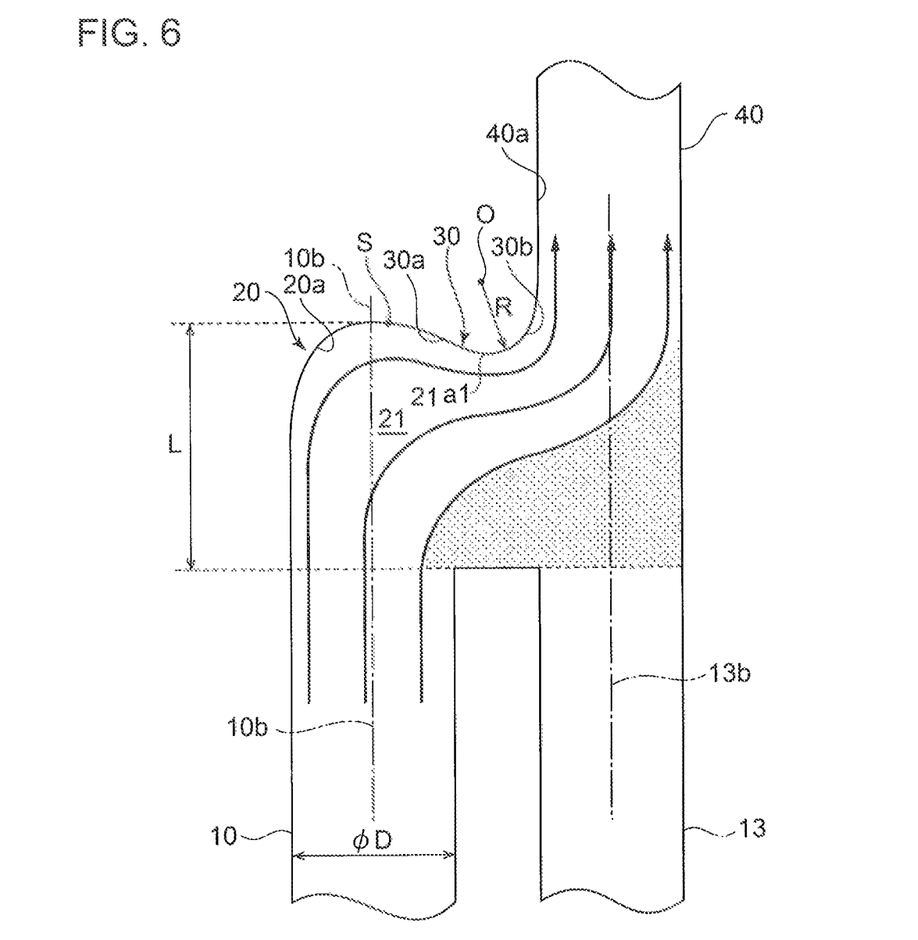
FIG. 6 is a cross-sectional view of a pipe connection structure according to an embodiment of the present invention, where the connection pipe has a curved portion before the outlet pipe.

FIG. 6 is a cross-sectional view of a pipe connection structure according to an embodiment of the present invention, where a curved portion 30 is provided in front of the outlet pipe 40 of the connection pipe 20.

In some embodiments, as shown in FIGS. 5A, 5B, and 6, the inner wall 21a forming the space section 21 inside the connection pipe 20 includes a top-portion inner wall 21a1 on the side to which the outlet pipe 40 is connected, the top-portion inner wall 21a1 being positioned between the outlet pipe 40 and the first inlet pipe 10. A curved portion 30 curved in an arc shape and protruding into the space section 21 is formed on the top-portion inner wall 21a1. In the depicted embodiment, the curved portion 30 has an arc having a radius R and a center O on the outer side of the connection pipe 20.

The gas discharged from the first inlet pipe 10 flows through the space section 21 with an enhanced linearly and into the outlet pipe 40. The flow of the gas is likely to deviate corresponding to the amount of offset of the outlet pipe 40 from the first inlet pipe 10. That is, inside the outlet pipe 40, the gas is likely to deviate toward the first inlet pipe 10. In this regard, the curved portion 30 is disposed on the top-portion inner wall 21a1 of the connection pipe 20 forming the flow passage before the gas flows into the outlet pipe 40. The curved portion 30 raises the risk of the linearly of the gas weakening and a swirl flow occurring, However, a swirl flow is likely to occur in the vicinity of the inlet of the connection pipe 20 where the space section 21 is widened.

The space section 21 is narrow in the vicinity of the outlet of the connection pipe 20, and thus the swirl flow generates slightly. Thus, with the curved portion 30 protruding into the space section 21 disposed on the top-portion inner wall 21a1 positioned between the outlet pipe 40 and the first inlet pipe 10, some swirl flow may occur, but it is rather possible to cancel a deviated flow reliably.

Furthermore, the curved portion 30 is configured such that the inner wall 30b disposed on the side of the outlet pipe 40, of the inner wall 30b forming the curved portion 30, is formed on a position in contact with the inner wall 40a on a curved-portion side of the outlet pipe 40. Thus, the curved portion 30 is formed in a position adjoining to the outlet pipe 40, and thus it is possible to suppress generation of a swirl flow, and to cancel a deviated flow of the gas flowing into the outlet pipe 40.

Furthermore, the curved portion 30 extends in a direction substantially orthogonal to the moving direction of the gas flowing toward the outlet pipe 40 via the space section 21 inside the connection pipe 20 from the first inlet pipe 10 farther from the outlet pipe 40 (see FIG. 5A).

Thus, when the gas passes through the curved portion 30, it is possible to make the gas flow uniformly in a direction substantially orthogonal to the moving direction of gas. When the gas passes through the curved portion 30, it is possible to send the flow of gas in a direction substantially orthogonal to the extending direction of the curved portion 30, and to spread the gas flow deviated to one side of the outlet pipe 40 to the other side of the outlet pipe 40. Thus, it is possible to improve the accuracy of removal of the flow rate distortion of gas flowing into the outlet pipe 40.

Figure 7:
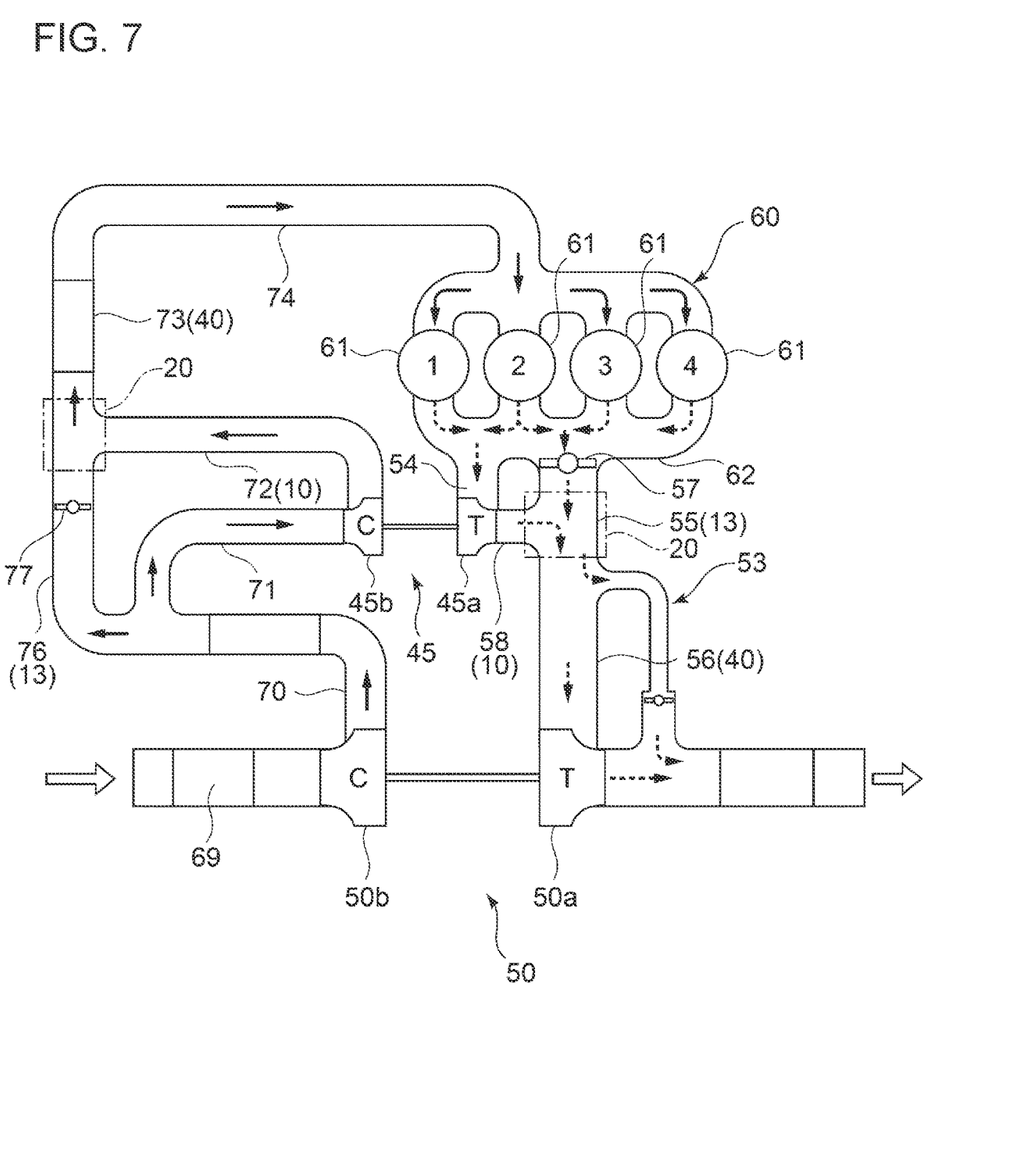
FIG. 7 is a schematic configuration diagram of a two-stage turbo pipe provided with the pipe connection structure of the present invention.

FIG. 7 is a schematic configuration diagram of a two-stage turbo pipe provided with the pipe connection structure of the present invention.

As shown in FIG. 7, the two-stage turbo pipe has a high-pressure turbo 45 and a low-pressure turbo 50 connected in series, and the high-pressure turbo 45 is disposed upstream of the low-pressure turbo 50 in an exhaust passage 53. The exhaust gas discharged from a cylinder 61 of an engine 60 is collected in an exhaust manifold 62, passes through the exhaust passage 53 and the high-pressure turbine 45a of the high-pressure turbo 45, while some of the exhaust gas flows through a high-pressure side turbine bypass passage 55, and through the low-pressure side turbine introduction passage 56, before being sent into the low-pressure turbine 50a of the low-pressure turbo 50. An exhaust gas control valve 57 is disposed in the high-pressure side turbine bypass passage 55.

Here, of the above described first inlet pipe 10 and second inlet pipe 13, the first inlet pipe 10 is applied to the high-pressure side turbine lead-out passage 58 for leading out exhaust gas discharged from the high-pressure turbine 45a of the high-pressure turbo 45 in the two-stage supercharging system in which the low-pressure turbo 50 and the high-pressure turbo 45 are connected in series, while the second inlet pipe 13 is applied to the high-pressure side turbine bypass passage 55 bypassing the high-pressure turbine 45a. The outlet pipe 40 is applied to the low-pressure side turbine introduction passage 56 which introduces exhaust gas into the low-pressure turbine 50a of the low-pressure turbo 50. Further, the high-pressure side turbine lead-out passage 58, the high-pressure side turbine bypass passage 55, and the low-pressure side turbine introduction passage 56 are connected to the connection pipe 20.

The exhaust gas control valve 57 is for adjusting the relationship between the exhaust gas amount of the high-pressure turbo 45 and the exhaust gas amount sent to the low-pressure turbine 50a of the low-pressure turbo 50 bypassing the high-pressure turbo 45, by controlling the opening degree of the exhaust gas control valve 57. That is, exhaust gas from the high-pressure turbine 45a of the high-pressure turbo 45 is sent into the low-pressure turbine 50a of the low-pressure turbo 50, through the high-pressure side turbine lead-out passage 58, having its flow rate adjusted by the exhaust gas control valve 57 and being mixed with exhaust gas flowing through the high-pressure side turbine bypass passage 55 in the connection pipe 20, and then through the low-pressure side turbine introduction passage 56.

In the low-pressure turbo 50, the low-pressure compressor 50b is coaxially driven by the low-pressure turbine 50a, and compresses air from an air cooler 69 and supplies the air to the high-pressure compressor 45b of the high-pressure turbo 45 through a low-pressure side compressor lead-out passage 70, and a high-pressure side compressor introduction passage 71.

In the high-pressure turbo 45, the high-pressure compressor 45b is coaxially driven by the high-pressure turbine 45a, and is supplied from an air-supply manifold 75 to the cylinder 61 of the engine 60 via a high-pressure side compressor lead-out passage 72, an inter cooler 73, and a supply air introduction passage 74.

Furthermore, a high-pressure side compressor bypass passage 76 is provided, bypassing the high-pressure compressor 45b and being in communication with the high-pressure side compressor introduction passage 71 and the high-pressure side compressor lead-out passage 72. A compressor bypass valve device 77 is disposed in the high-pressure side compressor bypass passage 76. The compressor bypass valve device 77 controls the amount of air that bypasses the high-pressure compressor 45b.

In the depicted embodiment, in the above described pipe connection structure, of the above described first inlet pipe 10 and second inlet pipe 13, the first inlet pipe 10 is applied to the high-pressure side compressor lead-out passage 72 for leading out intake gas from the high-pressure compressor 45b of the high-pressure turbo 45 in the two-stage supercharging system in which the low-pressure turbo 50 and the high-pressure turbo 45 are connected in series, while the second inlet pipe 13 is applied to the high-pressure side compressor bypass passage 76 bypassing the high-pressure compressor 45b of the high-pressure turbo 45. The outlet pipe 40 is applied to the supply air introduction passage 74 for introducing intake air to the engine 60 of the two-stage supercharging system. The high-pressure side compressor lead-out passage 72, the high-pressure side compressor bypass passage 76, and the supply air introduction passage 74 are connected to the connection pipe 20.

As described above, the pipe connection structure capable of suppressing generation of a swirl flow is disposed in a flow passage connected to the high-pressure turbo 45 on the side closer to the high-pressure turbine 45a, in the two-stage supercharging system, and thereby it is possible to suppress occurrence of an event in which exhaust gas discharged from the high-pressure side turbine lead-out passage 58 while the high-pressure side turbine bypass passage 55 is shut off becomes a swirl flow to be supplied to the low-pressure turbine 50a of the low-pressure turbo 50. Thus, it is possible to suppress performance reduction of the low-pressure turbo 50.

Furthermore, the pipe connection structure capable of suppressing generation of a swirl flow is disposed in a flow passage connected to the high-pressure turbo 45 on the side closer to the high-pressure compressor 45b, in the two-stage supercharging system, and thereby it is possible to suppress occurrence of an event in which intake gas discharged from the high-pressure compressor lead-out passage 72 while the high-pressure side compressor bypass passage 76 is shut off becomes a swirl flow to be supplied to the engine 60.

The embodiments of the present invention have been described above. However, the present invention is not limited thereto. For instance, various modifications may be applied as long as they do not depart from the object of the present invention.

For instance, while the pipe connection structure of the above embodiment is to be used in piping of a turbocharger as a premise, the structure may be applied to the shape of a similar collective pipe provided for another usage, or may be applied to a case in which the operation medium is a liquid, such as a coolant-water pipe and a lubricant oil pipe.

DESCRIPTION OF REFERENCE NUMERALS

10 First inlet pipe
13 Second inlet pipe
10a, 13a Outlet-side end portion
10b, 13b Axis
20 Connection pipe
21 Space section
21a Inner wall
21a1 Top-portion inner wall
23 Bottom portion
23a, 23b, 27b Hole portion
25 Body portion
25a End portion
27 Top portion
27a Protruding portion
30 Curved portion
30 Surface
30b, 40a Inner wall
40 Outlet pipe
45 High-pressure turbo
45a High-pressure turbine
45b High-pressure compressor
50 Low-pressure turbo
50a Low-pressure turbine
50b Low-pressure compressor
53 Exhaust passage
54 High-pressure side turbine introduction passage
55 High-pressure side turbine bypass passage
56 Low-pressure side turbine introduction passage
57 Exhaust gas control valve
58 High-pressure side turbine lead-out passage
60 Engine
61 Cylinder
62 Exhaust manifold
69 Air cooler
70 Low-pressure side compressor lead-out passage
71 High-pressure side compressor introduction passage
72 High-pressure side compressor lead-out passage
73 Inter cooler
74 Supply air introduction passage
75 Intake gas manifold
76 High-pressure side compressor bypass passage
77 Compressor bypass valve device
d Flow direction
ds Circumferential component
dv Axial component
K Middle L1, L2 Flow passage length
P1, P2 Connection position
D Virtual diameter

The invention claimed is:

1. A pipe connection structure, comprising:
two inlet pipes through which a gas is capable of flowing;
a connection pipe to which respective outlet-side end portions of the two inlet pipes are connected at a distance; and
an outlet pipe connected to the connection pipe at an opposite side to a side where the two inlet pipes are connected to the connection pipe, the outlet pipe being capable of being in communication with the two inlet pipes via a space section inside the connection pipe,
wherein the two inlet pipes include a first inlet pipe disposed on a first side and a second inlet pipe disposed on a second side, in a width direction of the connection pipe, across a middle of connection positions of the two inlet pipes to the connection pipe,
wherein the outlet pipe is connected to a position offset toward the second side in the width direction of the connection pipe, and
wherein, along an axial direction of the first inlet pipe, the space section inside the connection pipe has an axial length not smaller than a virtual diameter D defined by following expression (1):

$$D=\sqrt{(4A/\pi)} \quad (1)$$

where A is a cross-sectional area of the first inlet pipe and π is pi.

2. The pipe connection structure according to claim 1,
wherein an inner wall forming the space section inside the connection pipe includes a top-portion inner wall to which the outlet pipe is connected and which is disposed between the outlet pipe and the first inlet pipe, and a curved portion curved in an arc shape and protruding into the space section is formed on the top-portion inner wall.

3. The pipe connection structure according to claim 2,
wherein the curved portion has an inner wall forming the curved portion, and a part of the inner wall on a side of the outlet pipe is formed on a position adjoining to an inner wall of the outlet pipe on a side of the curved portion.

4. The pipe connection structure according to claim 2,
wherein the curved portion extends in a direction substantially orthogonal to a moving direction of the gas flowing toward the outlet pipe via the space section inside the connection pipe from the first inlet pipe.

5. A two-stage supercharging system, comprising;
an engine;
an exhaust passage through which exhaust gas discharged from the engine flows;
a low pressure turbo, including a low-pressure turbine driven by the exhaust gas flowing through the exhaust passage and a low-pressure compresssor coaxially driven with the low-pressure turbine:
a high-pressure turbo including a high-pressure turbine, disposed upstream of the low-pressure turbo in the exhaust passage, driven by the exhaust gas flowing through the exhaust passage, and a high-pressure compressor coaxially driven with the high-pressure turbine; and
a pipe connection structure according to claim 1,
wherein the first inlet pipe is applied to a high-pressure side turbine lead-out passage for leading out the exhaust gas discharged from the high-pressure turbine,
wherein the second inlet pipe is applied to a high-pressure side turbine bypass passage which bypasses the high-pressure turbine,
wherein the outlet pipe is applied to a low-pressure side turbine introduction passage for introducing the exhaust gas to the low-pressure turbine, and
wherein the high-pressure side turbine lead-out passage, the high-pressure side turbine bypass passage, and the low-pressure side turbine introduction passage are connected to the connection pipe.

6. A two-stage supercharging system, comprising;
an engine;
an exhaust passage through which exhaust gas discharged from the engine flows;
a low pressure turbo, including a low-pressure turbine driven by the exhaust gas flowing through the exhaust passage and a low-pressure compresssor coaxially driven with the low-pressure turbine:
a high-pressure turbo including a high-pressure turbine, disposed upstream of the low-pressure turbo in the exhaust passage, driven by the exhaust gas flowing through the exhaust passage, and a high-pressure compressor coaxially driven with the high-pressure turbine; and
a pipe connection structure according to claim 1,
wherein the first inlet pipe is applied to a high-pressure side compressor lead-out passage for leading out intake gas from the high-pressure compressor,
wherein the second inlet pipe is applied to a high-pressure side compressor bypass passage which bypasses the high-pressure compressor,
wherein the outlet pipe is applied to a supply air introduction passage for introducing the intake gas to the engine of the two-stage supercharging system, and
wherein the high-pressure side compressor lead-out passage, the high-pressure side compressor bypass passage, and the supply air introduction passage are connected to the connection pipe.

7. The pipe connection structure according to claim ,
wherein the first inlet pipe and the second inlet pipe are configured such that the gas flows selectively through only one of the first inlet pipe or the second inlet pipe.

8. A pipe connection structure, comprising:
two inlet pipes through which a gas is capable of flowing;
a connection pipe to which respective outlet-side end portions of the two inlet pipes are connected at a distance; and
an outlet pipe connected to the connection pipe at an opposite side to a side where the two inlet pipes are connected to the connection pipe, the outlet pipe being capable of being in communication with the two inlet pipes via a space section inside the connection pipe,
wherein the two inlet pipes include a first inlet pipe disposed on a first side and a second inlet pipe disposed on a second side, in a width direction of the connection pipe, across a middle of connection positions of the two inlet pipes to the connection pipe,
wherein the outlet pipe is connected to a position offset toward the second side in the width direction of the connection pipe, and
wherein an axial length of the space section inside the connection pipe, along an axial direction of the first inlet pipe, is not less than 50% of a length between a connection position at which the first inlet pipe is connected to the connection pipe and a connection position at which the outlet pipe is connected to the connection pipe, along the axial direction of the first inlet pipe.

* * * * *